UNITED STATES PATENT OFFICE.

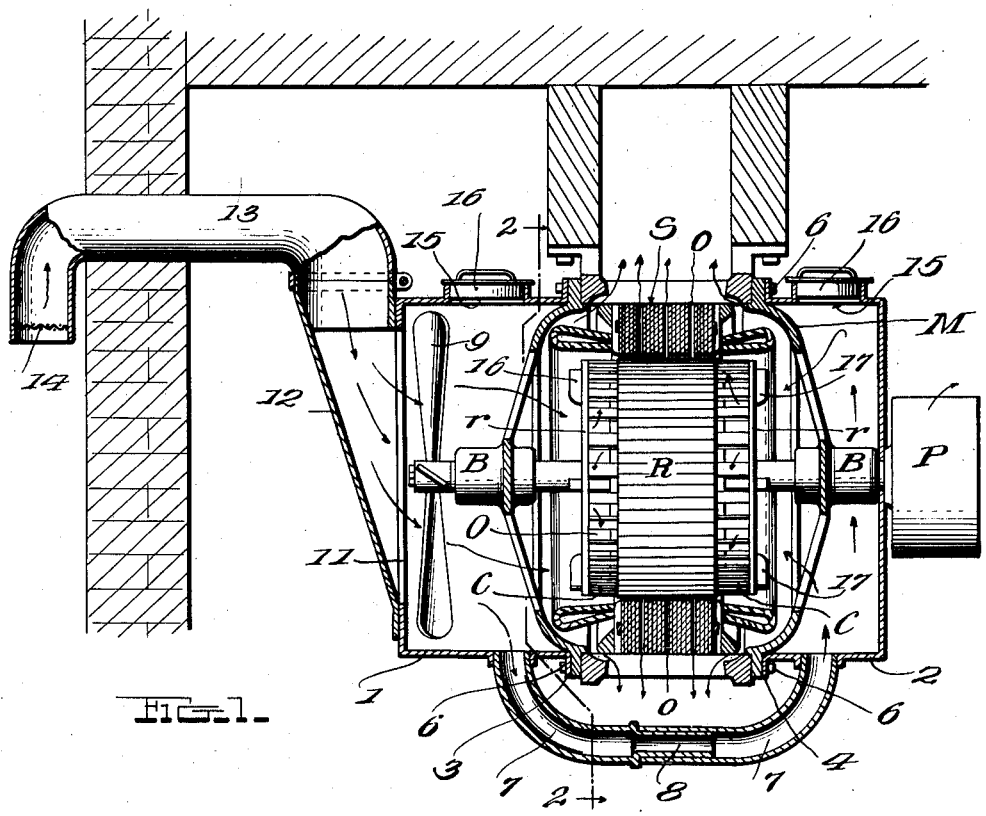

JOHN WILLIAM NOLAN, OF PAWTUCKET, RHODE ISLAND, ASSIGNOR, BY MESNE ASSIGNMENTS, TO MOTOR COOLING APPARATUS COMPANY OF RHODE ISLAND, OF PAWTUCKET, RHODE ISLAND, A CORPORATION OF RHODE ISLAND.

COOLING SYSTEM FOR ELECTRIC MOTORS.

1,175,977.   Specification of Letters Patent.   Patented Mar. 21, 1916.

Application filed February 2, 1914. Serial No. 816,066.

*To all whom it may concern:*

Be it known that I, JOHN WILLIAM NOLAN, a citizen of the United States, residing at Pawtucket, in the county of Providence and State of Rhode Island, have invented certain new and useful Improvements in Cooling Systems for Electric Motors; and I do declare the following to be a full, clear, and exact description of the invention, such as will enable others skilled in the art to which it appertains to make and use the same.

The present invention relates to apparatus for cooling electric motors or analogous electric machines and is especially adapted for use in connection with alternating current motors and in its preferred form is well adapted for application to existing motors.

The object of the invention is to provide apparatus which will effect the cooling of the motor in a uniformly reliable and satisfactory manner.

To this end the invention contemplates providing two closed chambers or casings upon opposite ends of the motor which are connected by an air passage or by-pass, so that a portion of the cooling air which has been drawn or forced into one of the chambers or casings will flow through the motor and that another portion of this cooling air will pass from the first chamber or casing into the other chamber or casing and flow from there through the motor. The air is preferably drawn into the first chamber or casing and is forced through the by-pass and through the motor by a fan secured to the end of the motor-shaft within the first casing. The air is also preferably supplied to the first casing through a supply pipe leading from the outside air and provided with means for separating dust and impurities from the air so that the air passing through the motor is free from foreign matter which would tend to clog the air-passages through the working parts of the motor and thus interfere with the proper cooling thereof.

The invention will be readily understood from an inspection of the accompanying drawings and the following detailed description of the mechanism illustrated therein.

In the drawings Figure 1 is a vertical longitudinal section through an alternating current motor showing the preferred form of the invention applied thereto, and Fig. 2 is a vertical section on the line 2—2 of Fig. 1.

In the embodiment illustrated, I have shown an alternating current motor M of the induction type, comprising the usual stator S and rotor R, said rotor being mounted in the usual manner upon the shaft $s$ which revolves in bearings B, as is common in motors of this character. The current conductors C of the rotor R are connected at their opposite ends by the usual short circuiting rings $r$ and said current conductors project beyond the opposite ends of the laminations forming the core of the rotor, this also being common construction.

Coming now more particularly to the details of the present invention, I provide a pair of hoods 1 and 2 closed at their outer and open at their inner ends and provided with annular attaching flanges 3 and 4 which are secured by means of screws 6 to the shell of the motor M. Each casing 1 and 2 is provided at a suitable point, with one section of a by-pass 7, the ends of the sections being adapted to telescope as shown at 8.

As clearly shown in Fig. 1, the shaft $s$ of the motor projects through the casing 2 and is provided with the pulley P, for obvious reasons. The opposite end of said shaft $s$, however, is disposed within the casing 1 and is provided with a suction fan 9, the blades of which rotate in close proximity to an air intake opening 11 in the end of the casing 1. The opening 11 is substantially incased by an inlet casing 12 with the upper end of which, an air intake pipe 13, leading from a source of cool air communicates. The pipe 13 is provided with a screen or strainer 14, which, as shown, is preferably disposed within the outer end of said pipe.

The casings 1 and 2 are provided with suitable hand holes 15, which are normally closed by caps 16, said holes being provided for the purpose of gaining access to the parts within the casings 1 and 2, without the necessity of removing said casings.

In addition to the suction fan 9, I prefer to employ two series of radial fan blades or buckets 16 and 17, which are secured in any suitable manner to the opposite ends of the rotor or armature R.

With the parts arranged as above described, the rotor R is set in motion by electric current in the usual manner. The rotation of the rotor R will, of course, turn the shaft s and will drive the suction fan 9 in such a direction as to cause air to be drawn in through the pipe 13 and into the hood 1. The buckets 16 will now become active and will assist in forcing some of the air through the openings O between the current conductors C, while some of the same will be forced to the open air through the openings o between the various field windings of the stator S. The supply of air is so great, however, that all of the same is not allowed to pass through the above-mentioned openings. Consequently, some of the same will be forced from the casing 1 through the by-pass 7, and into the casing 2 at the opposite end of the motor, where it will be acted upon by the buckets 17, which will assist in forcing it through the openings O at this end of the rotor and through certain of the openings in the stator S.

From the above description and explanation, it will be evident that the temperature of the motor will be maintained at an extremely low point, due to the various currents of air passing through the rotor and stator thereof. It will also be clearly seen that, owing to the action of the screen or strainer 14, no dust or dirt is allowed to enter the casings 1, and that no particles are allowed to enter the openings in the stator S due to the fact that a blast of air is continually flowing therefrom.

I preferably form all parts of metal, but it will be understood that I need not be limited to this material, since, the system would work equally as well, were all parts formed of fiber or other suitable substance.

Although I have described my invention with considerable minuteness and as applied to an alternating current machine, I do not wish to be limited to details of construction or to this application, otherwise than specified in the appended claims.

Having thus described my invention, what I claim as new and desire to secure by Letters-Patent is:—

1. The combination with an electric motor, of a pair of casings inclosing the opposite ends of said motor, a by-pass connecting said casings, an air intake into one of the casings and a driven fan in the casing having the air intake for the purpose set forth.

2. The combination with an electric motor, of a plurality of radial fan blades secured to the opposite ends of its rotor, a pair of casings inclosing the opposite ends of said motor, a by-pass connecting said casings, an air intake into one of the latter, and a driven fan in the casing having the air intake, for the purpose set forth.

3. The combination with an electric motor, of a plurality of radial fan blades secured to the opposite ends of its rotor, a pair of casings inclosing the opposite ends of said motor, a by-pass connecting said casings, an air intake into one of the latter, and a suction fan mounted on the end of the shaft of said motor for the purpose set forth.

4. The combination with an electric motor of casings forming therewith a closed chamber at each end of the motor, an air conduit connecting the chambers, an air intake into one chamber, and means for forcing air through the intake and air conduit into the chambers and through the motor.

5. The combination with an electric motor, of a pair of casings open at their inner ends and provided with attaching flanges for engaging the ends of the motor casing, a by-pass connecting the casings, an air intake into one of the casings, an air supply pipe leading to said intake, and a fan secured to the end of the motor shaft within the casing having the air intake.

6. The combination with an electric motor, of a pair of casings inclosing the opposite ends of said motor, a by-pass connecting said casings, an air intake into one of the casings, and means for forcing air through the intake and by-pass into the casings and thence through the motor.

7. A cooling apparatus for electric motors comprising a pair of inclosing casings having open inner ends constructed for attachment to the opposite ends of a motor casing, an air inlet in each casing, a conduit for connecting the air inlet of one casing with the other casing and a supply pipe for connection with the air inlet of said other casing through which air may be forced into the casings and through the motor.

8. A cooling apparatus for electric motors comprising a pair of inclosing casings having open inner ends constructed for attachment to the ends of a motor casing, an air inlet opening in each casing, a conduit for connecting the air inlet of one casing with the other casing, and a fan for attachment to the motor shaft within one of the casings.

9. The combination with an electric motor of casings forming therewith a closed chamber at each end of the motor, an air conduit connecting the chambers, an air intake into one chamber, a supply pipe connected with the intake, an air screen in the pipe, and means for forcing the air through the supply pipe and air conduit into the chambers and through the motor.

10. The combination with an electric motor of casings forming therewith a closed chamber at each end of the motor, an air conduit connecting the chambers, an air intake into one chamber, and a fan secured to the motor shaft within the latter chamber for forcing air through the intake and air conduit into the chambers and through the motor.

11. The combination with a dynamo electric machine embodying a stator and a rotor, of a casing affixed to the stator at each side of the machine, each of these casings being closed on all sides except its inner side, which latter opens into the interior of the machine, a by-pass connecting the two chambers exterior of the stator, an intake connected to one of said chambers, and means for causing a current of air to pass into the intake chamber and be there divided, part of the air passing into the interior of the machine and part passing by way of the by-pass into the opposite chamber and thence into the interior of the machine from that side.

12. The combination with a dynamo electrical machine embodying a rotor and a stator, air exits being provided through the stator, a chamber attached to the stator at each side of the machine, each of these chambers being closed on all sides except its inner side, which latter is open to the interior of the machine, an air by-pass connecting the two chambers externally of the stator, an intake connected to one of the chambers, and means for forcing air through the intake and thence into the interior of the machine, substantially in the manner described.

In testimony whereof I have hereunto set my hand in presence of two subscribing witnesses.

JOHN WILLIAM NOLAN.

Witnesses:
   Socrates Scholfield,
   George Thomas Randle.